(12) United States Patent
Atkins et al.

(10) Patent No.: US 10,540,920 B2
(45) Date of Patent: Jan. 21, 2020

(54) DISPLAY MANAGEMENT FOR HIGH DYNAMIC RANGE VIDEO

(71) Applicant: DOLBY LABORATORIES LICENSING CORPORATION, San Francisco, CA (US)

(72) Inventors: Robin Atkins, Campbell, CA (US); Timo Kunkel, Oakland, CA (US); Thaddeus Beier, Lafayette, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 831 days.

(21) Appl. No.: 14/767,249

(22) PCT Filed: Feb. 13, 2014

(86) PCT No.: PCT/US2014/016304
§ 371 (c)(1),
(2) Date: Aug. 11, 2015

(87) PCT Pub. No.: WO2014/130343
PCT Pub. Date: Aug. 28, 2014

(65) Prior Publication Data
US 2016/0005349 A1    Jan. 7, 2016

Related U.S. Application Data

(60) Provisional application No. 61/810,104, filed on Apr. 9, 2013, provisional application No. 61/767,380, filed on Feb. 21, 2013.

(51) Int. Cl.
*G09G 3/20*     (2006.01)
*G06T 5/20*     (2006.01)

(52) U.S. Cl.
CPC ............. *G09G 3/2003* (2013.01); *G06T 5/20* (2013.01); *G06T 2207/10024* (2013.01); *G09G 2340/06* (2013.01)

(58) Field of Classification Search
None
See application file for complete search history.

(56) References Cited

U.S. PATENT DOCUMENTS 5,737,032 A    4/1998  Stenzel
8,593,480 B1   11/2013 Ballestad
(Continued)

FOREIGN PATENT DOCUMENTS

EP    1073284    1/2001
EP    1385143    1/2004
(Continued)

OTHER PUBLICATIONS

Zolliker, P. et al "Retaining Local Image Information in Gamut Mapping Algorithms" IEEE Transactions on Image Processing, vol. 16, No. 3, Mar. 1, 2007, pp. 664-672.
(Continued)

*Primary Examiner* — Aaron M Richer (57) ABSTRACT

A display management processor receives an input image with enhanced dynamic range to be displayed on a target display which has a different dynamic range than a reference display. The input image is first transformed into a perceptually-corrected IPT color space. A non-linear mapping function generates a first tone-mapped signal by mapping the intensity of the input signal from the reference dynamic range into the target dynamic range. The intensity (I) component of the first tone-mapped signal is sharpened to preserve details, and the saturation of the color (P and T) components is adjusted to generate a second tone-mapped output image. A color gamut mapping function is applied to the second tone-mapped output image to generate an image
(Continued)

suitable for display onto the target display. The display management pipeline may also be adapted to adjust the intensity and color components of the displayed image according to specially defined display modes.

21 Claims, 6 Drawing Sheets

(56) References Cited

U.S. PATENT DOCUMENTS

| | | | | |
|---|---|---|---|---|
| 9,077,994 | B2 | 7/2015 | Miller | |
| 2004/0228522 | A1* | 11/2004 | Nakajima | H04N 1/56 382/162 |
| 2007/0085855 | A1* | 4/2007 | Tin | G09G 5/02 345/590 |
| 2010/0085487 | A1* | 4/2010 | Sarkar | H04N 1/6005 348/649 |
| 2010/0195173 | A1* | 8/2010 | Dalrymple | G06T 1/00 358/520 |
| 2011/0084990 | A1* | 4/2011 | An | G09G 3/3648 345/690 |

FOREIGN PATENT DOCUMENTS

| | | |
|---|---|---|
| JP | 2010-263598 | 11/2010 |
| RU | 2298226 | 4/2007 |
| WO | 2012/012489 | 1/2012 |
| WO | 2012/125802 | 9/2012 |
| WO | 2013/046096 | 4/2013 |

OTHER PUBLICATIONS

Mantiuk, R. et al "Color Correction for Tone Mapping" Computer Graphics Forum, Wiley-Blackwell Publishing Ltd. vol. 28, No. 2, Apr. 1, 2009, pp. 193-202.

Liu, Z. et al "The Research on Mechanism of Color Management System Based on iCAM Color Appearance Model" Computer and Mathematics with Applications, Pergamon Press, Oxford, GB, vol. 57, No. 11-12, Jun. 1, 2009, pp. 1829-1834.

Fairchild, M. et al "Predicting the Lightness of Chromatic Object Colors Using CIELAB" Color Research and Application, vol. 16, No. 6, Dec. 1, 1991, pp. 385-393.

Ebner, F. et al. "Development and Testing of a Color Space (IPT) with Improved Hue Uniformity" The Sixth Color Imaging Conference: Color Science, Systems, and Applications, Scottsdale, Arizona, Nov. 1998, pp. 8-13.

* cited by examiner

DISPLAY MANAGEMENT FOR HIGH DYNAMIC RANGE VIDEO

CROSS-REFERENCE TO RELATED APPLICATIONS

This application claims priority to U.S. Provisional Patent Application Ser. No. 61/767,380, filed on Feb. 21, 2013, and to U.S. Provisional Patent Application Ser. No. 61/810,104, filed on Apr. 9, 2013, both of which are incorporated herein by reference in their entirety.

TECHNOLOGY

The present invention relates generally to images. More particularly, an embodiment of the present invention relates to the display management process of images with high or enhanced dynamic range.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of N-bits per pixel (e.g., N=8). Images where N≤8 (e.g., color 24-bit JPEG images) are considered images of standard dynamic range, while images where N>8 may be considered images of enhanced dynamic range. EDR and HDR images may also be stored and distributed using high-precision (e.g., 16-bit) floating-point formats, such as the OpenEXR file format developed by Industrial Light and Magic.

Until fairly recently, displays have had a significantly narrower DR than HDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to HDR or EDR.

Most consumer desktop displays support luminance of 200 to 300 cd/m$^2$ or nits. Most consumer HDTVs range from 300 to 1000 cd/m$^2$. As the availability of EDR content grows due to advances in both capture equipment (e.g., cameras) and EDR displays (e.g., the PRM-4200 professional reference monitor from Dolby), EDR content may be color graded on EDR displays that support a variety of dynamic ranges (e.g., from 1,000 nits to 5,000 nits or more). Similarly, EDR content may be displayed on both SDR displays and EDR displays with dynamic range different than the display used to color grade the original content. As appreciated by the inventors here, improved techniques for the display management of EDR images onto HDR displays are desirable for both backward compatibility and a superior immersive experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Efficient display management (e.g., tone and gamut mapping) of enhanced dynamic range (EDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the efficient display management of EDR images. A display management processor receives an input image with enhanced dynamic range to be displayed on a target display which has a different dynamic range than a reference display. The input image is first transformed from an input color space (e.g., RGB) into a perceptually-corrected IPT color space (IPT-PQ). A non-linear mapping function generates a first tone-mapped signal by mapping the intensity of the input signal from the reference dynamic range into the target dynamic range. The intensity (I) component of the first tone-mapped signal is sharpened to preserve details using unsharp masking, and the saturation of the color (P and T) components is appropriately adjusted to generate a second tone-mapped output image. A color gamut mapping function may be applied to the second tone-mapped output image to generate an image suitable for display onto the target display. The display management pipeline may also be adapted to adjust the intensity and color components of the displayed image according to specially defined display modes.

In cases where the input image is received in a color format where chroma components are in a lower spatial resolution than the luma resolution, then in example embodiments, the display management process may be divided into two paths that may be executed in parallel. One path operates on all color components, but at the lower resolution of the chroma components of the input image, while the second path operates on only luminance-related data, but at the original (full) resolution of the luma component.

Example Display Management Processing Pipeline

Figure 1A:
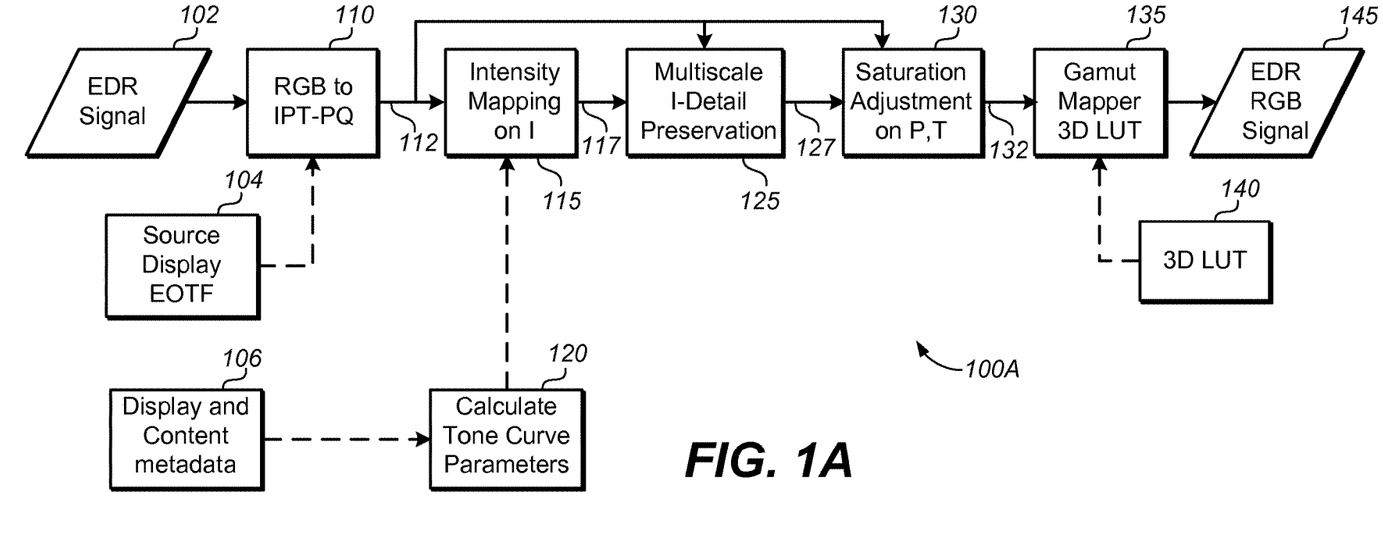
FIG. 1A-FIG. 1C depict example processes for the display management of EDR images according to embodiments of the present invention.

FIG. 1A depicts an example process for the display management of EDR images (also referred as HDR images) according to an embodiment of the present invention. As depicted in FIG. 1A, a video processor (e.g., a set-top box, an image display, or other suitable image processor) receives EDR image (102) and optionally associated metadata (104) and (106). EDR image (102) may comprise part of a frame or a full frame of a sequence of images, such as an EDR video signal. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR image (102) may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intent.

EDR input (102) may also include source display metadata (104) related to the display used to color grade the image during program production. For example, such metadata may include the reference electro-optical transfer function (EOTF) as defined by Recommendation ITU-R BT.1866 (March 2011). The EDR input may also include additional source display and content metadata (106), such as the maximum and minimum brightness of the source or reference display, the maximum, minimum, and average mid-tone of the data, and the intensity of ambient light during color grading. For example, the metadata for a reference monitor may include the following example parameters used in production:

Source Monitor Min. brightness, Smin=0.005 nits;
Source Monitor Max. brightness, Smax=4000 nits;
Ambient Light, Samb=10 nits;
Gamma, Sgamma=2.4;
Color Space=DCI P3, White Point=D65;

Metadata for the reference monitor need to be transmitted typically only once; however, metadata for the video data may be transmitted on a per-frame basis, on a per-scene basis, or whenever there is a change. If there are no metadata related to the source content, then in some embodiments such data may be extracted by analyzing the source video content.

The IPT-PQ Color Space

In a preferred embodiment, the processing pipeline is performed in what will be referred to as the IPT-PQ color space; however, similar processing steps may be performed in other color spaces, such as RGB, YCbCr, XYZ, CIE-Lab, and the like. IPT, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of the target display.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data Exchange across different display capabilities," by J. S. Miller et al., filed on Dec. 6, 2012, (now U.S. Pat. No. 9,077,994) and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

Table 1 describes the calculation of the Perceptual Curve EOTF for converting digital video code values into absolute linear luminance levels at a point of display. Also included is the inverse OETF calculation for converting absolute linear luminance into digital code values

TABLE 1

Exemplary Equation Definitions:

D = Perceptual Curve digital code value, SDI-legal unsigned integer, 10 or 12 bits
b = number of bits per component in digital signal representation, 10 or 12
V = normalized Perceptual Curve signal value, $0 \leq V \leq 1$
Y = normalized luminance value, $0 \leq Y \leq 1$
L = absolute luminance value, $0 \leq L \leq 10,000$ cd/m$^2$
Exemplary EOTF Decode Equations:

$$V = \frac{D - 4 \cdot 2^{b-10}}{1015 \cdot 2^{b-10}}$$

$$Y = \left(\frac{\max[(V^{1/m} - c_1), 0]}{c_2 - c_3 V^{1/m}}\right)^{1/n} \quad (t1)$$

L = 10,000 · Y
Exemplary OETF Encode Equations:

$$Y = \frac{L}{10,000}$$

$$V = \left(\frac{c_1 + c_2 Y^n}{1 + c_3 Y^n}\right)^m \quad (t2)$$

$$D = \text{INT}(1015 \cdot V \cdot 2^{b-10}) + 4 \cdot 2^{b-10} \quad (t3)$$

Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 . . . and +1 for fractional parts in the range of 0.5 to 0.9999 . . . , i.e. it rounds up fractions above 0.5.
2. All constants are defined as exact multiples of 12 bit rationals to avoid rounding concerns.
3. R, G, or B signal components are to be computed in the same way as the Y signal component described above.

Figure 2:
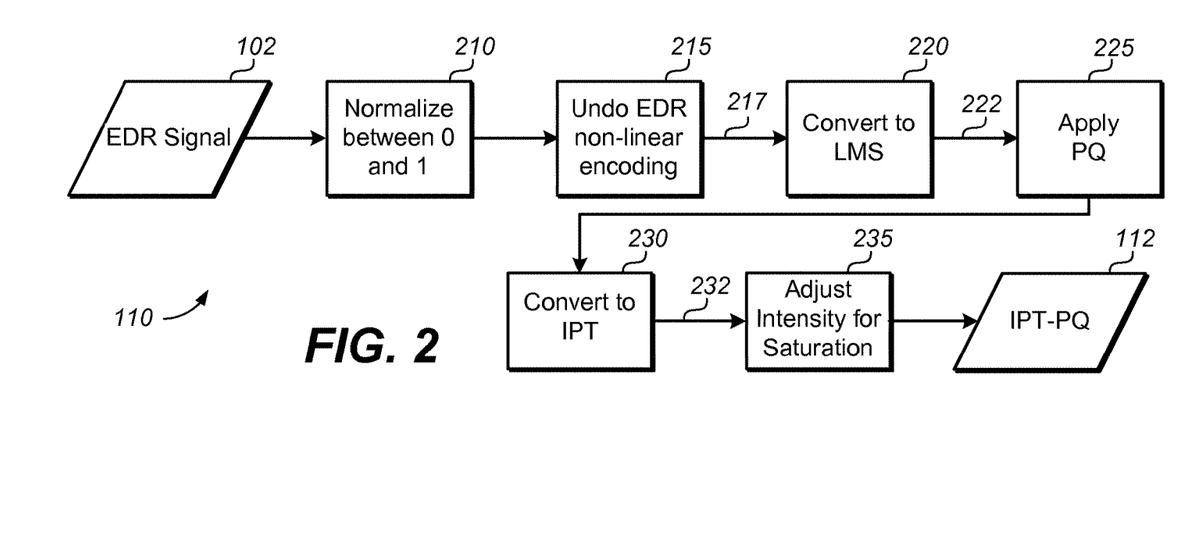
FIG. 2 depicts an example process for converting input EDR data from an input RGB color space into the IPT-PQ space according to an embodiment of the present invention.

FIG. 2 depicts an in more detail an example process for the color conversion step (110), according to an embodiment. As depicted in FIG. 2, given input EDR signal (102) which is in a first color space (e.g., RGB), color space transformation step (110) translates it into signal (112) in the perceptually-corrected IPT color space (IPT-PQ). This color transformation may comprise the following steps:

a) (Step 210) Normalize the pixel values of the input signal (102) (e.g., 0 to 4095) into pixel values with a dynamic range between 0 to 1.

b) (Step 215) Use the EOTF (as provided by metadata (104)) to reverse or undo the source display's conversion from code values to luminance. For example, if the input signal is gamma coded, then this step applies an inverse gamma function. If the input signal is PQ-encoded according to the '212 PCT application, then this step applies an inverse PQ function. In practice, the normalization step (210) and the inverse non-linear encoding (215) may be performed using pre-computed 1-D Look-up tables (LUTs).

c) (Step 220) Convert the output of step b) to the LMS color space.

d) (Step 225) According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in step (225) the traditional power function for a non-linear encoding of LMS to IPT is replaced with the PQ non-linear encoding. For example, the non-linear L, M, and S values are computed the same way as the V signal in equation (t2), where the Y signal is replaced by the linear L, M, or S component values (222). In some embodiments, a normalized version of PQ encoding may be used, wherein the step of equation (t3) may be omitted and the range of output PQ values is between 0 and 1.

e) (Step 230) Using a standard LMS to IPT linear transform, step 230 completes the conversion of signal 222 to the IPT color space.

f) (Step 235) In some embodiments, the I component of the IPT-PQ output 232 may also be adjusted to account for the Helholtz-Kohraush effect whereby saturated colors appear brighter than a white color with the same luminance value. Given a pixel in the IPT space represented by the values $I_i$, $P_i$, and $T_i$, let $CH_i = \sqrt{P_i^2 + T_i^2}$, then in an embodiment, the output I' of step 235 may be expressed as $$I'_i = I_i + 0.202 CH_i \quad (1)$$

The range of the output IPT-PQ signal (112) is 0 to 1 for the I component (corresponding to a dynamic range between 0-10,000 nits) and between −1 and 1 for the P and T components.

In some embodiments, the complete color transformation pipeline (e.g., 110) may be computed using a 3D LUT.

Tone Mapping

Figure 3:
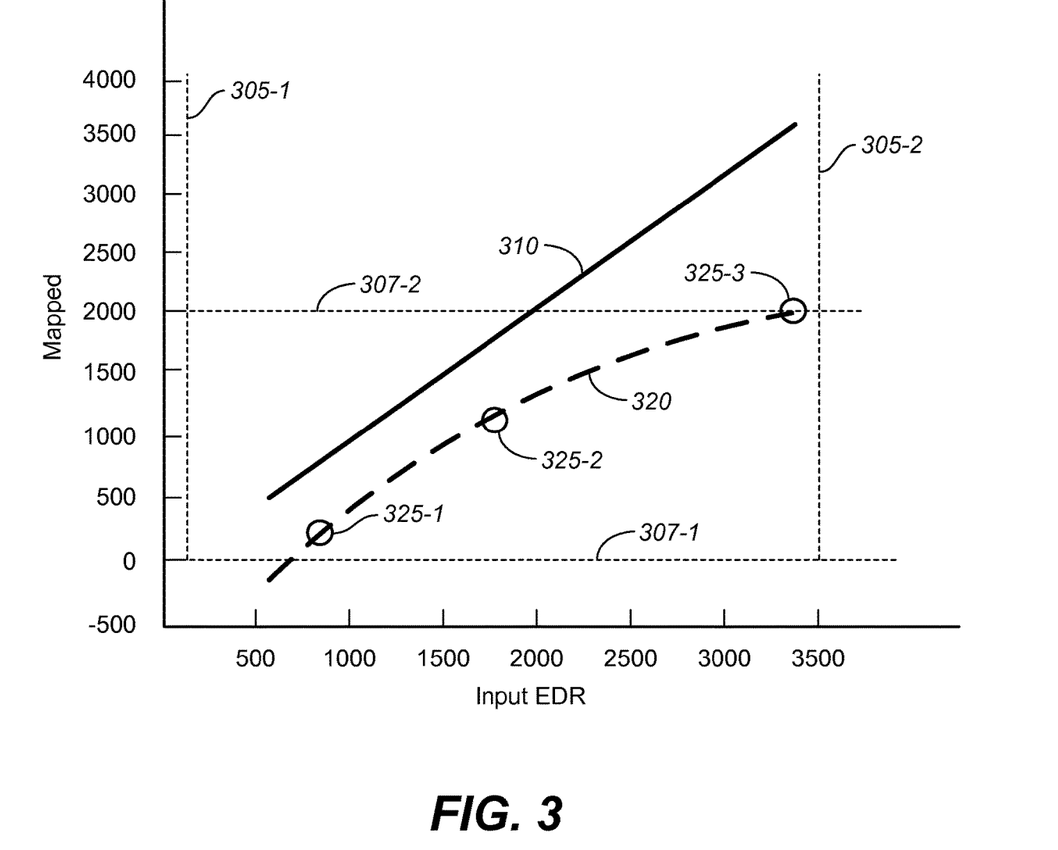
FIG. 3 depicts an example of non-linear dynamic range mapping for EDR images according to an embodiment of the present invention.

After the color transformation step (110), the intensity (I) of signal (112) needs to be mapped to fit within the constraints of the target display. FIG. 3 depicts an example of a non-linear mapping function (320) computed according to an embodiment (e.g., step 115). The target display may be an EDR display or an SDR display. If the target display has the same characteristics as the reference (or source) production display used to process (e.g., color grade) input (102), then no transformation is required. Such a one-to-one linear mapping is depicted in FIG. 3 by linear mapping (310); however, if the target display has a dynamic range that is lower or higher than the dynamic range of the reference production display, then processing step (115) will map the dynamic range of the input signal to the dynamic range of the target display.

In FIG. 3, let boundaries (305-1) and (305-2) depict the minimum and maximum brightness levels of the input signal (Input EDR). Let also (307-1) and (307-2) depict the minimum and maximum brightness levels of the target display.

Assuming an input to reference display dynamic range mapping depicted by function (320), the output of the non-linear mapping (e.g., 320) fits better within the dynamic range constraints (e.g., 307-1 and 307-2) of the target display. An example non-linear mapping transform is described by A. Ballestad et al., in PCT application with Ser. Number PCT/US2012/029189, filed on Mar. 15, 2012, titled "Method and apparatus for image data transformation," (now U.S. Pat. No. 8,593,480, which is incorporated herein by reference in its entirety.

According to the Ballestad '189 PCT application, an example transfer function for non-linear mapping (115) may be denoted as $$Y_{out} = \left( \frac{C_1 + C_2 Y_{in}^n}{1 + C_3 Y_{in}^n} \right)^m, \qquad (2)$$

where $C_1$, $C_2$, and $C_3$ are constants, $Y_{in}$ is the input value for a color channel (e.g., the I channel), $Y_{out}$ is the output value for the color channel, and n and m are parameters. This transfer function is an example of a parameterized sigmoidal tone curve function. Parameters $C_1$, $C_2$, and $C_3$ are determined based on the definition of three anchor points (e.g., 325-1, 325-2, and 325-3), which in turn are defined based on the brightness characteristics of the reference (or source) display, which are typically extracted from input metadata (106), and the brightness characteristics of the target display, which are typically already known to the processor performing the display management process.

In an example embodiment, step (120) may compute the tone curve parameters of equation (2) as follows:

a) Compute the Source to Target ratio, S2Tratio.

Let Tmin, and Tmax denote the minimum and maximum brightness of the target display, represented with PQ encoding. Let also Smin, and Smax denote the minimum and maximum brightness of the source display, also PQ encoded, then, in an embodiment, the S2Tratio may be defined as:

$$S2Tratio = \sqrt{\frac{Tmax - Tmin}{Smax - Smin}}. \qquad (3)$$

Without loss of generality, in some embodiments, the value of S2Tratio may also be bounded to never be more than one; that is, the decoder may assume that the reference display is always at least as bright as the target display. Note that if the S2Tratio=1, then step (115) may be skipped.

Without loss of generality, let the input sequence be characterized by three variables, which in an example embodiment are denoted by the variables Crush, Clip, and Mid, which denote respectively the lowest black level, the highest white level, and the average gray level of the input sequence. Their values can be computed for each frame, a part of a frame, or for a sequence of frames in a scene. The values of these parameters may either be computed based on the input video stream or they may be part of the input metadata (106). In an embodiment, these parameters are calculated on a per scene basis. As used herein, the terms 'scene' or 'shot' denote a series of sequential-in-capture frames that may share the same overall brightness characteristics. Scene cuts may be determined manually, or they may also be part of the input metadata. For example, an array of Cuts [ ] may define the frame numbers of scene cuts. Alternatively, a parameter in each frame may define whether the frame represents the beginning of a scene cut.

Given these values and the S2Tratio value, in an embodiment, one may compute the following intermediate tone curve adjustment parameters:

$$Slope = \sqrt{\frac{1}{S2Tratio}}$$

denotes the mid-tones contrast. It is adjusted according to the S2Tratio value in order to preserve the appearance of contrast. It can be visualized as the slope of a line tangent to mapping curve (320) close to the middle anchor point (352-2).

$$Key = \frac{Mid - Crush}{Clip - Crush}$$

is an indication of a "dark" or "bright" scene. Low Key (dark) scenes may be mapped slightly brighter and high Key (bright) scenes may be mapped slightly darker in order to preserve dark and bright detail respectively.

Shift=Mid*(1−S2Tratio)*(2*Key) denotes an amount by which the image is darkened.

Rolloff is typically a constant (e.g., 1/3) and represents the steepness of the transition between mid-tones and highlights/shadows. A smaller value indicates a sharper transition and will have a visual effect of "soft clipping".

Let Min=max(Crush−Shift, Tmin) and Max=min(Clip−Shift,Tmax), then, in an embodiment, using MATLAB notation, the tone curve parameters of the non-linear mapping of equation (2) may be computed as depicted in Table 2.

TABLE 2

```
x1 = Crush.^(Slope/Rolloff);
x2 = Mid.^(Slope/Rolloff);
x3 = Clip.^(Slope/Rolloff);
y1 = Min.^(1/Rolloff);
y2 = (Mid − Shift).^(1/Rolloff);
y3 = Max.^(1/Rolloff);
temp = x3*y3*(x1 − x2) + x2*y2*(x3 − x1) + x1*y1*(x2 − x3);
c1 = (x2*x3*(y2 − y3)*y1 − x1*x3*(y1 − y3)*y2 + x1*x2*(y1 −
   y2)*y3)/temp;
c2 = (−(x2*y2 − x3*y3)*y1 + (x1*y1 − x3*y3)*y2 − (x1*y1 −
   x2*y2)*y3)/temp;
c3 = ((x3 − x2)*y1 − (x3 − x1)*y2 + (x2 − x1)*y3)/temp;
```

Given the $C_1$, $C_2$, and $C_3$ parameter above, in an embodiment, the output (117) ($I_m$) of the intensity mapping step (115) may be computed as:

$$I_m = \left( \frac{C_1 + C_2 I_o^n}{1 + C_3 I_o^n} \right)^{Rolloff}. \qquad (4)$$

where $I_o$ denotes the I-component of EDR IPT-PQ signal (112).

Multiscale Detail Preservation for the I Component

The tone mapping operator of equation (4) is typically referred to as a global tone-mapping operator since the same equation is applied to a whole frame. In an embodiment, global tone-mapping may be followed by a multi-scale tone-mapping operator (125) which improves local contrast. An example of such a local tone mapping operator is described by Ballestad in the '189 PCT application. Alternatively, in another embodiment, the output (117) of the intensity mapping step (115) may be followed by an unsharp masking technique, such as the one described in "*Retaining local image information in gamut mapping algorithms,*" by P. Zolliker and K. Simon, IEEE Trans. on Image Processing, Vol. 16, No. 3, March 2007, pp. 664-672, incorporated herein by reference.

Let $I_o$ denote the intensity of input signal (112), and let $I_m$ denote the intensity of tone-mapped output (117), then according to an embodiment, the intensity of output $I_S$ (127) of the multiscale detail preservation step (125), may be expressed as $$I_S = I_o - F((I_o - I_m), H), \qquad (5)$$

where F(I,H) denotes applying to image I a separable filter with kernel H. In an example embodiment, H comprises an 11×11 Gaussian filter with σ=2; however, alternative filters may also be applied. In some embodiments, depending on the characteristics of the input signal, this step may also be skipped.

In some embodiments, the detail preservation process of equation (5) may be further enhanced by employing an additional edge-detection filter to reduce potential halos around high-contrast edges, including letterboxes and subtitles. In an embodiment, let $$I_B = F((I_o - I_m), H_B), \qquad (6)$$

and $$I_E = F((I_o - I_m), H_E), \qquad (7)$$

denote, respectively, the outputs of a low-pass filter (LPF) with kernel $H_B$ and an edge-detection filter with kernel $H_E$. Then given an $I_E$ output that may be constrained within the range [0,1], the multiscale detail preservation step (125) may be expressed as $$I_S = I_o - ((1 - I_E)I_B + I_E(I_o - I_m)) \qquad (8)$$

Compared to equation (5), whenever a strong edge is detected, then $I_S$ is closer to the original tone-mapped signal than the low-pass filtered signal.

In some embodiments, additional weights may also be applied, as in $$I_S = I_o - (w_1(1 - I_E)I_B + w_2 I_E(I_o - I_m)) \qquad (9)$$

where $w_1$ and $w_2$ are implementation dependent weights. In another embodiment, given a constant a and an edge detection threshold $T_e$, the output of the multiscale preservation step (125) may be expressed as $$I_S = \begin{cases} I_o - ((1 - a)I_B + a(I_o - I_m)) & \text{if } I_E \geq T_e \\ I_o - I_B & \text{otherwise} \end{cases} \qquad (10)$$

For example, according to equation (10), for a=1, if no edge is detected, the $I_S$ output is determined according to equation (5); however, when a strong edge is detected, then $I_S = I_m$.

Figure 6:
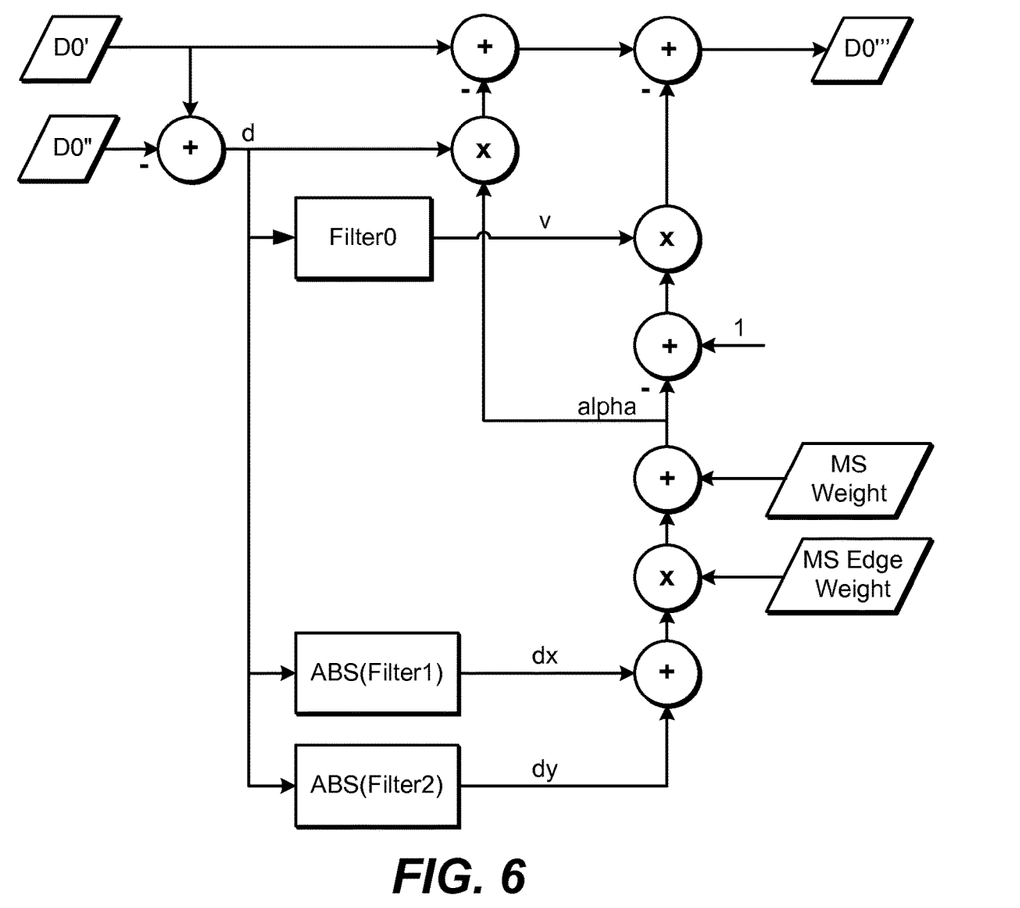
FIG. 6 depicts an example implementation of multiscale detail preservation according to an embodiment of the present invention.

In an embodiment, the LPF filter is a Gaussian filter and the edge detection filter may be a separable filter with coefficients derived by taking the first derivative of the LPF filter. However, any edge detection filter may be applied. By applying separable low-pass and edge-detection filters, in an embodiment, the operations of low-pass filtering, edge-detection in the horizontal direction, and edge detection in the vertical direction may be applied in parallel to take advantage of parallel architectures (as in an FPGA or custom integrated circuit) that may integrate separate circuits for each of these filters. Such an example implementation is depicted in FIG. 6, wherein:

Input D0' corresponds to $I_o$;
Input D0" corresponds to $I_m$;
Output D0''' corresponds to $I_S$;
Filter 0 corresponds to the Low Pass Filter (LPF);
Filter1 and Filter2 correspond to horizontal and vertical edge detection filters;
ABS( ) denotes the absolute value function; and
MS_weight and MS_edge_weight are adjustable parameters in the range [0, 1],
(e.g., MS_weight=0.0 and MS_edge_weight=1.0).

For a given bit-depth N, let max_value denote the maximum value $2^N - 1$. Let dx and dy denote the outputs of the edge filters Filter1 and Filter2, then, in an embodiment, the value of alpha may be computed as:
dx=dx÷max_value
dy=dy÷max_value
alpha=MAX(0, MIN(1, (ABS(dx)+ABS(dy))*ms_edge_weight+(ms_weight)))
Then, the output may be computed as:
d0[x, y]=D0'[x, y]−d[x,y]*alpha−v[x, y]*(1.0−alpha)
D0'''[x, y]=CLIP3(0, max_value, d0),
where d[x, y] denotes the difference image $I_o - I_m$, v[x, y] denotes the output of the LPF (e.g., $I_B$), and the CLIP3 (a, b, x) function denotes that the value of x is bounded between a lower value a and an upper value b.

Saturation Adjustment

In an IPT signal, P and T are just relative intensities of the color differences compared to the intensity I. Since the steps (115) and (125) have modified the I color component, the P and T color components need to be adjusted to preserve hue and saturation. An example of such a process (130) is depicted in FIG. 4.

Figure 4:
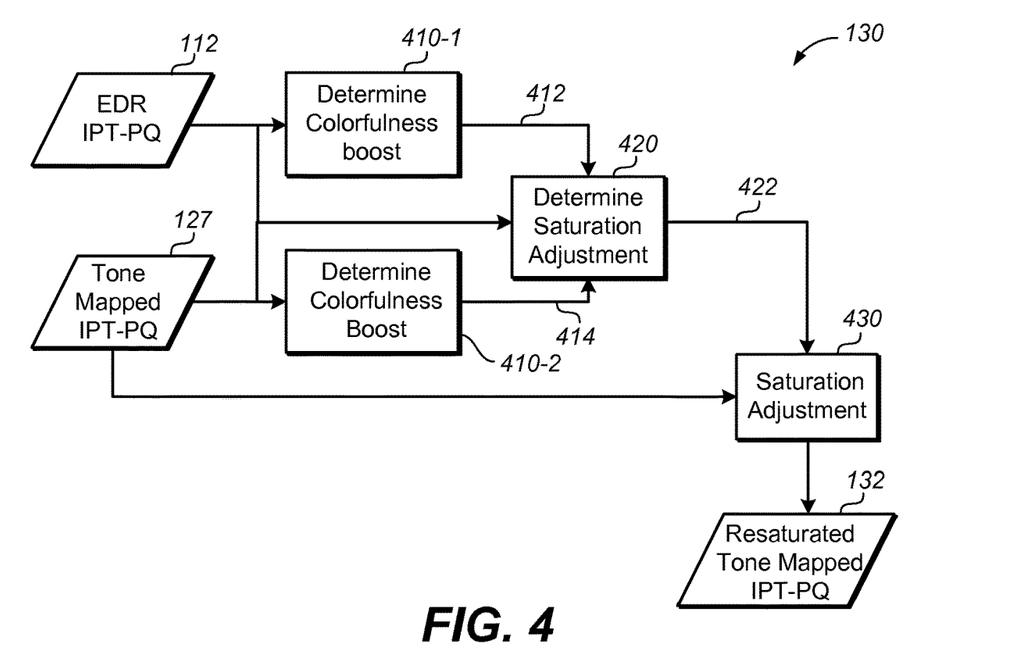
FIG. 4 depicts an example process for saturation adjustment of the P and T color components in in a tone-mapped IPT-PQ image according to an embodiment of the present invention.

As depicted in FIG. 4, parameters to boost colorfulness and saturation may be computed based on the original input in the IPT-PQ space (112) and the tone-mapped output (127). These parameters are computed on a per pixel level and the same scaler (S) is applied to both the P and T color components. In an example embodiment, let the colorfulness boosts be determined using linear mapping functions $$CEDR = k_1 I_o + k_2,$$

$$CMapped = k_1 I_S + k_2, \qquad (11)$$

where $K_1$ and $k_2$ are constants based on psychophysical data. For example, in an embodiment, $K_1=0.5$ and $k_2=1.0$. In equation (6), CEDR (412) denotes the output of step (410-1) and CMapped (414) denotes the output of step (410-2). Then a saturation adjustment scaler (422) may be determined as $$S = \frac{I_S * CEDR}{I_o * CMapped}. \qquad (12)$$

Given S, and the original $P_o$ and $T_o$ color components of signal (112), the re-saturated $P_S$ and $T_S$ components of the tone-mapped output (132) may be computed as $$P_S = P_o * S, \text{ and}$$

$$T_S = T_o * S. \qquad (13)$$

In some embodiments, it may be beneficial to determine the colorfulness boost CMapped based on the original tone-mapped signal (117) ($I_m$) rather than the sharpened signal (127) ($I_S$), then CMapped=$k_1 I_m + k_2$ and $$S = \frac{I_m * CEDR}{I_o * CMapped}. \quad (14)$$

In an alternative embodiment, the saturation adjustment step may be part of the color transformation step (110). In an example embodiment, following the correction for the Helholtz-Kohraush effect (235) depicted by equation (1), one may apply the following chroma scaling:

$$S = \frac{1}{I_i'} + 0.5, \quad (15)$$

$$P_i = P_i S, \quad (16)$$

$$T_i = T_i S. \quad (17)$$

Color Gamut Mapper 3D LUT

The tone mapping and saturation boost processing steps may result in colors outside of the target display gamut. A 3D color gamut look up table (LUT) (140) may be computed and applied to the video signal (132) to adjust the color gamut. As part of the color gamut correction (135), the signal may also be transformed back to another color space (e.g., RGB), and may be gamma corrected to generate the final EDR signal (145) for either display on the target display and/or other post-processing.

Luminance and Color Adjustments

In certain embodiments it may be desirable to adjust (e.g., boost) luminance or chroma values of the input signal outside those values considered to represent the director's original intent. For example, many consumer televisions incorporate such picture modes as "vivid," "sports", or "cinema" with preset sets of display parameters that enhance the user's experience for specific content. In an embodiment, luminance boost parameters may be set as a function of the intermediate tone curve adjustment parameters, e.g., the Slope, Shift, Min, and Shift parameters, discussed earlier.

Let $Slope_{Pref}=Shift_{pref}=Min_{Pref}=Max_{pref}=1$ denote the default luminance boost parameters when no luminance boost is required. If a boost or alteration of the signal is desired, those four parameters can be adjusted. For example, without limitation, in an embodiment, those values may be set to $Slope_{Pref}=0.8$,
$Shift_{Pref}=0.005$,
$Min_{Pref}=0.0001$,
$Max_{Pref}=1.0$.

Then, the corresponding Slope, Shift, Min, and Shift parameters used to calculate the tone curve parameters (120) of equation (4) are adjusted as follows:

Slope=Slope*$Slope_{Pref}$
Shift=Shift*$Shift_{Pref}$
Min=Min*$Min_{Pref}$, and
Max=Max/$Max_{Pref}$ Applying these adjustments to Min, Max, Slope and Shift changes the original mapping range. Therefore, to bring the mapping range back to the original one (e.g. EDR min/max and display min/max, as defined from the display and content metadata (106)), the following equation is carried out after $I_m$ in equation (4) has been computed.

$$I_m = \left(\frac{I_m - Min}{Max - Min}\right) \cdot \left(Max \cdot Max_{Pref} - \frac{Min}{Min_{Pref}}\right) + \frac{Min}{Min_{Pref}}. \quad (18)$$

Chroma may also be adjusted. Given the $P_S$ and $T_S$ outputs from equation (8) (e.g., signal (132)), the ($P_S$, $T_S$) color components may be transformed into (chroma, hue) values using standard Euclidian to polar transformations. Then it is possible to adjust the chroma ($C_{in}$) (saturation, colorfulness) values by applying either linear or non-linear mapping functions. Examples of such mapping functions are depicted in FIG. 5.

Figure 5:
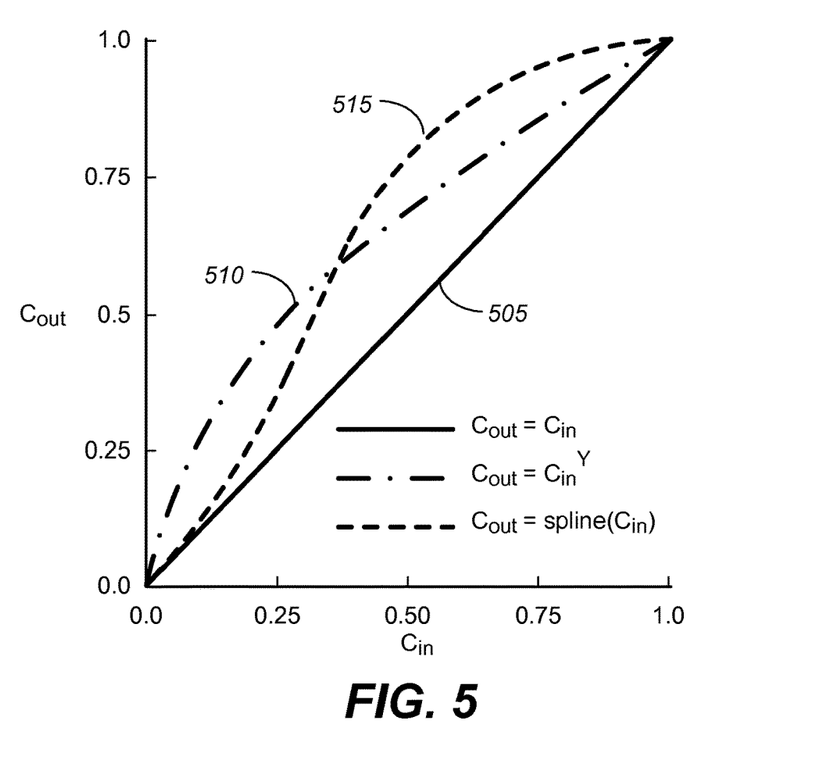
FIG. 5 depicts example mapping functions for chroma remapping according to possible embodiments of the present invention.

Without limitation, FIG. 5 depicts three example embodiments for a chroma mapping function. Let and $C_{out}=f(C_{in})$ depict the chroma adjustment input-output function. In a first embodiment (505)

$C_{out}=C_{in}$, hence no chroma adjustment is performed. In a second embodiment (510), $C_{out}=C_{in}^\gamma$, where γ is a constant. Finally, in a third embodiment (515) chroma may be expressed as the output of a non-linear function described by spline or sigmoid-like input output relationships.

In some embodiments, the chroma mapping function may be modulated as a function of hue. In such an embodiment, certain chromaticity regions (e.g., sky, grass, or skin tones) may be treated differently than others. In some embodiments, the chroma mapping function may also be modulated as a function of intensity (I). In some embodiments, chroma values may also be reduced to create a desaturated image for a special effect (e.g., sepia or old movie feeling).

After chroma adjustments, the transformed (chroma, hue) values are converted back to (P, T) values using standard polar to Euclidian transformations, and the remaining of the display management process continues. In some embodiments, the luma and chroma adjustments may be pre-computed and alternatively combined with other 3D LUTs of the display management pipeline.

Adjusting luminance and chroma parameters is strongly dependent on the capabilities and display characteristics of the target display. In some embodiments, the target TV manufacturer and model may be available to the set-top box or the display manager (DM) processor via ancillary information, such as the TV's EDID (Extended Display Identification Data). This information can be used to look up the capabilities of the display using a local or remote database (e.g., via an Internet or other up-link connection) and thus provide pre-computed and optimized boost parameters for the target display. Alternatively, if no specific information is available, the set-top box may provide to the user a selection of alternative display modes and allow the user to select the most preferred mode.

In some embodiments, when optimized 3D LUTs are not available for EDR display management for a target display, a set-top box (STB) may apply the methods described herein to compute new LUTs based on a set of parametric functions that may be pre-stored in the STB and the target display parameters. Upon connecting a new TV, a user may wait a few seconds until the new LUTs are computed; however, the results may be stored in the device memory to be reused later on.

Tone Mapping for Signals with Sub-Sampled Color

In some embodiments, EDR signal (102) may be received in a sub-sampled chroma format (e.g., YCbCr 4:2:0). Furthermore, output EDR RGB signal (145) may also need to be converted to a display specific format different than RGB 4:4:4 (e.g., YCbCr 4:2:0). While the display management process of 100A (FIG. 1A) may be easily modified to accommodate pre-processing or post-processing color transformation, color up-sampling, or down-sampling on the full-resolution inputs and outputs (e.g., on signal (102) before RGB to IPT-PQ step (110), or on the RGB signal (145)), it may be more computationally efficient to perform some of the display management operations on reduced-resolution signals. Examples of such embodiments are discussed next.

Figure 1B:
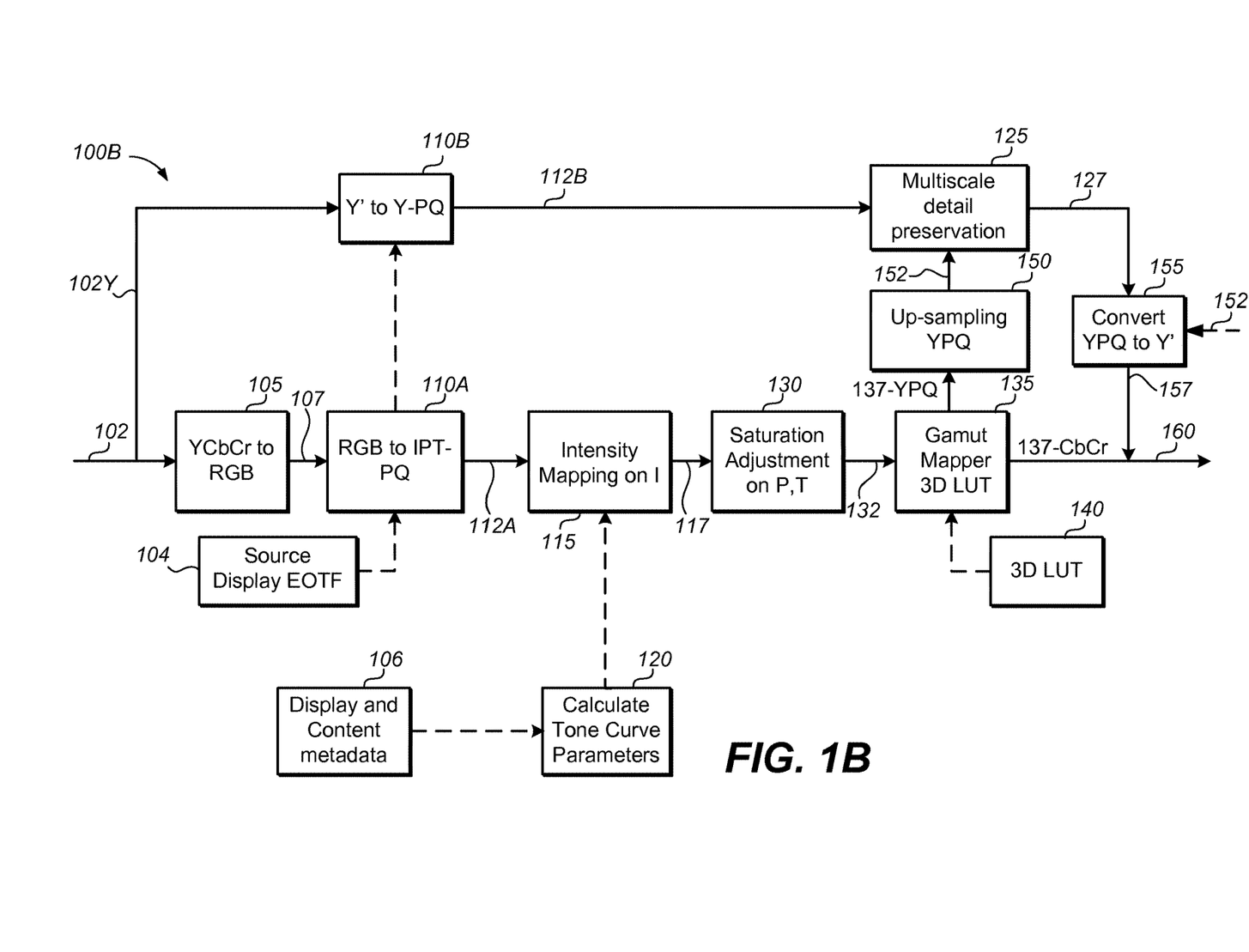

FIG. 1B depicts an example process (100B) for the display management of EDR images according to an alternative embodiment of the present invention. Without limitation, in an example, let the received EDR signal (102) be a YCbCr 4:2:0 signal and let the desired output (160) be a gamma encoded EDR YCbCr 4:2:0 signal. Similar processing may also be applied to other color formats with sub-sampled chroma, such as YCbCr 4:2:2 and the like.

As depicted in 100B, processing of input (102) may be split into two separate paths; processing of the Y component (102Y) at full (luma) resolution, and processing of an RGB signal (107) at the chroma resolution (e.g., at ¼ the resolution for 4:2:0 signals). Color converter (105) down-samples the input Y and then converts the down-sampled Y and the original CbCr input components into RGB (4:4:4) signal (107) with spatial resolution equal to the original chroma resolution. Color converter (110B) translates the full-resolution (102Y) signal to a perceptually-quantized (PQ) signal (112B). As discussed earlier, in the RGB to IPT-PQ processing step (100) (see FIG. 2), the input Y component of (102) may also be gamma-linearized and normalized (e.g., into the (0, 1) range) before applying the PQ function to the Y component.

Given the new signals (107) and (112B), processing on signal (107) proceeds as in (100A), except that the multi-scale detail preservation step (125) is now applied after the saturation and adjustment step (130). Because signal (132) is now ¼-th the resolution of the original signal (102), an additional up-sampling step (150) up-samples the output of the Gamut mapper (135) into a full-resolution signal (152) which is used as the tone-mapped ($I_m$) input of the multiscale detail preservation step (125). Signal (112B) is being used as the original signal $I_o$ (see equations (5)-(10)). Note that Gamut mapping process (135) may generate directly a signal in the (Y-PQ)CbCr (4:4:4) color space. Output EDR (160) is in YCbCr (4:2:0) format and comprises two signals: the chroma component (137-CbCr) computed by gamut mapper (135) plus the luma signal (157). Luma signal (157) may be generated by gamma correcting (155) the output of the multiscale detail preservation process (127). PQ decoding and gamma encoding (155) may utilize the EOTF parameters (152) (e.g., gamma, Min, and Max)) of the target display (not shown).

Figure 1C:
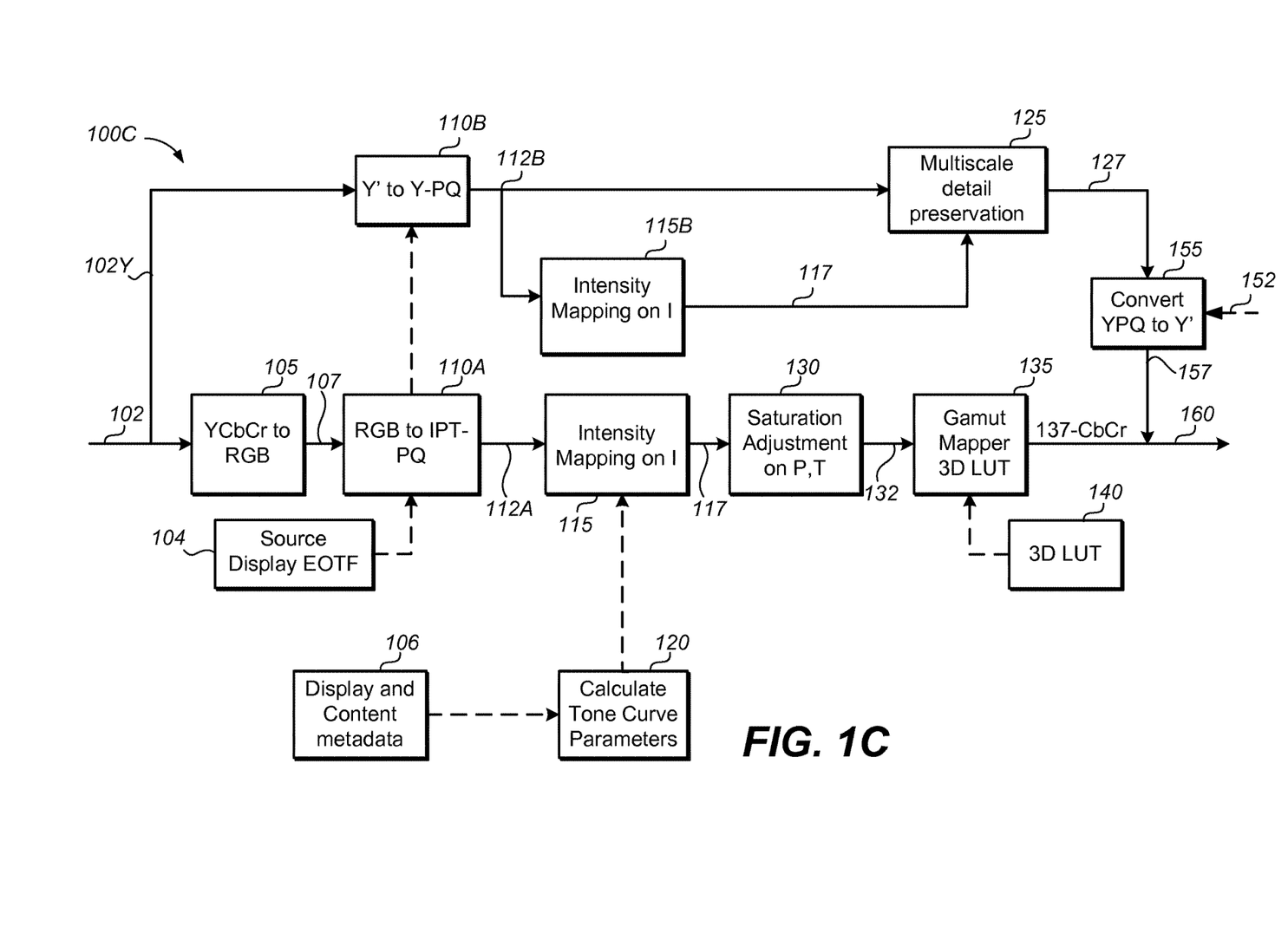

FIG. 1C depicts an alternative embodiment which parallelizes the multiscale and luma down-sampling operations to further improve the pixel pipeline efficiency and reduce the memory requirements. In this example, the full-resolution (Y) pipeline operates in full-resolution but requires fewer operations per pixel. In contrast, the RGB 4:4:4 pipeline has more operations per pixel but operates at ¼-th of the original luma pixel resolution. FIG. 1C is more amenable to parallel hardware implementations.

Compared to (100B), (100C) adds an additional intensity mapping step (115B) to the output ($I_o$ 112B) of color converter (110B); however, it eliminates the need for the up-sampling process (150) in (100B). Intensity mapping step (115B) may use the tone curve parameters computed in step 120. In some embodiments (not shown), the input to Intensity mapping (115B) may be signal (102Y) instead of signal (112B).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the display management and display of images with enhanced dynamic range, such as those described herein. The computer and/or IC may compute any of a variety of parameters or values that relate to the display management processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the display management of EDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient display management of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for the display management of images with one or more computer processors, the method comprising:
   accessing an input image in a first color space with a first enhanced dynamic range (EDR) of a source display device;
   performing a color transformation operation on the input image to generate a first output image (112) in a perceptually-corrected IPT color space (IPT-PQ), wherein the color transformation operation transforming the input image from the first color space to the IPT-PQ space is based at least in part on applying non-linear perceptual quantization (PQ) to the input image;
   performing a non-linear tone-mapping operation on an intensity (I) component of the first output image to generate an intensity component of a first tone-mapped image with a second dynamic range of a target display device, the second dynamic range of the target display device being different than the first dynamic range of the source display device;
   performing a detail preservation operation to generate an intensity component of a second output image in response to the intensity components of the first output image and the first tone-mapped image;
   performing a saturation adjustment operation on color (P, T) components of the second output image to generate color components of a second tone-mapped image, wherein the saturation adjustment operation is determined by the intensity component of the first output image and the intensity component of either the second output image or the first tone-mapped image; and
   performing a color gamut mapping operation on the second tone-mapped image to generate a third output image;
   causing a display mapped image generated from the third output image to be rendered on the target display device;
   wherein performing the detail preservation operation further comprises computing $$I_S = I_o - F((I_o - I_m), H),$$

where $F(I,H)$ denotes applying to an image I a filter with kernel H, $I_o$ denotes intensity pixel values of the first output image, $I_m$ denotes intensity pixel values of the first tone-mapped output image, and $I_s$ denotes intensity pixel values of the second output image.

2. The method of claim 1, wherein the first color space comprises the RGB color space and performing the color transformation operation further comprises:
   removing any non-linear encoding from an input signal to generate a linear RGB signal;
   converting the linear RGB signal into an LMS color signal; and
   performing the non-linear PQ operation and a transformation operation based on a transformation matrix on the LMS color signal to generate an IPT-PQ color space signal.

3. The method of claim 2, further comprising adjusting the intensity (I) of the IPT-PQ color signal to generate an adjusted IPT-PQ signal, wherein the adjusting step is performed at least in part based on an intensity adjustment function as follows:

$$I'_i = I_i + d * CH_i$$

where d is a constant, and given $I_i$, $P_i$, and $T_i$ values of a pixel of the IPT-PQ color signal, $CH_i = \sqrt{P_i^2 + T_i^2}$ and $I'_i$ denotes an intensity value of the adjusted IPT-PQ signal.

4. The method of claim 1, wherein the non-linear tone-mapping operation is based at least in part on a non-linear tone-mapping function expressed as a parameterized sigmoidal tone curve function, wherein parameters of the non-linear tone-mapping function are determined based on characteristics of a source display and a target display.

5. The method of claim 4 wherein the characteristics of the source display comprise a minimum brightness value and a maximum brightness value for the source display.

6. The method of claim 4, wherein the characteristics of the target display comprise a minimum brightness value and a maximum brightness value for the target display.

7. The method of claim 4, wherein the characteristics of the source display are accessed through received source display metadata.

8. The method of claim 4, wherein the sigmoidal tone function is expressed as $$I_m = \left( \frac{C_1 + C_2 I_o^n}{1 + C_3 I_o^n} \right)^{Rolloff}$$

wherein n is an exponential power parameter; $C_1$, $C_2$, $C_3$, and Rolloff are constants defining the parameters of the tone-mapping function, and for an input $I_o$, $I_m$ is a corresponding output value.

9. The method of claim 8, wherein the $C_1$, $C_2$, and $C_3$ constants are determined at least in part based on one or more gray-value characteristics of an input signal.

10. The method of claim 9, wherein the gray-value characteristics of the input signal are accessed through content metadata and comprise a minimum luminance value (Crush), a maximum luminance value (Clip), and an average mid-tone luminance value (Mid).

11. The method of claim 8 wherein the $C_1$, $C_2$, and $C_3$ constants are determined at least in part based on one or more intermediate tone curve adjustment parameters.

12. The method of claim 4 wherein the parameters of the non-linear tone-mapping function are adjusted to boost the intensity of the luminance of the first tone-mapped image.

13. The method of claim 12 wherein boosting the intensity of the luminance further comprises:
   computing a first set of intermediate adjustment tone curve parameters to determine a mapping range of the non-linear tone-mapping function with no luminance boosting;
   scaling the first set of intermediate adjustment tone curve parameters in response to a set of desired intermediate adjustment tone curve parameters;
   determining the parameters of the non-linear tone-mapping function based on a second set of intermediate adjustment tone curve parameters;
   applying the non-linear tone-mapping function to the intensity of the first output signal to determine an intermediate tone-mapped signal; and
   adjusting the intensity of the intermediate tone-mapped signal to determine the first tone-mapped signal.

14. The method of claim 1 wherein the kernel H comprises an 11×11 Gaussian filter with standard deviation equal to 2.

15. The method of claim 1 wherein the kernel H comprises a low-pass filter.

16. The method of claim 15 further comprising:
applying an edge detection filter to the $I_o$–$I_m$ signal to derive an edge output image; and
generating the $I_s$ signal in response to both the output of the low-pass filter and the edge output image.

17. The method of claim 1, wherein performing the saturation adjustment operation comprises scaling color components of the first output signal by a scaling constant which is determined in response to intensity pixel values of the first output image and intensity pixel values of either the second output image or the first tone-mapped image.

18. The method of claim 17, wherein computing the scaling constant (S) comprises computing $$S = \frac{I_S * CEDR}{I_o * CMapped}$$

where CEDR is a variable determined as a linear function of the intensity ($I_o$) of the first output signal and CMapped is a variable determined as a linear function of the intensity ($I_s$) of the second output signal.

19. The method of claim 1 further comprising adjusting the color components of the second tone-mapped image, wherein the adjusting step comprises:

converting color pixel values ($P_S$, $T_S$) of the second tone-mapped image to (chroma, hue) pixel values using an Euclidian to polar coordinates transform;

mapping the (chroma, hue) pixel values to adjusted (chroma, hue) values using a mapping function; and converting the adjusted (chroma, hue) values to adjusted ($P_S$, $T_S$) color values using a polar to Euclidian coordinates transform.

20. An apparatus comprising one or more computer processors, and a non-transitory computer-readable storage medium having stored thereon computer-executable instruction for executing a method with the one or more processors in accordance with claim 1.

21. A non-transitory computer-readable storage medium having stored thereon computer-executable instruction for executing a method with one or more computer processors in accordance with claim 1.

* * * * *